United States Patent [19]

Koiwai et al.

[11] Patent Number: 5,319,684
[45] Date of Patent: Jun. 7, 1994

[54] METHOD FOR ASSEMBLING NUCLEAR FUEL ASSEMBLY AND APPARATUS THEREFOR

[75] Inventors: Taichi Koiwai; Katsunori Ohuchi; Shuji Yamazaki, all of Ibaraki, Japan

[73] Assignee: Mitsubishi Nuclear Fuel Co., Tokyo, Japan

[21] Appl. No.: 972,371

[22] Filed: Nov. 5, 1992

[30] Foreign Application Priority Data

Nov. 8, 1991 [JP] Japan .................. 3-293437

[51] Int. Cl.⁵ .............................. G21C 19/00
[52] U.S. Cl. ........................ 376/261; 376/269; 29/701
[58] Field of Search ............. 376/261, 262, 264, 269, 376/271, 260; 976/DIG. 68; 29/701

[56] References Cited

U.S. PATENT DOCUMENTS

| | | | |
|---|---|---|---|
| 4,448,744 | 5/1984 | Karger et al. | 376/262 |
| 4,625,396 | 12/1986 | Ahmed et al. | 29/701 |
| 4,747,997 | 5/1988 | Boatwright . | |
| 4,760,637 | 8/1988 | Kerrey et al. . | |
| 4,800,061 | 1/1989 | Shallenberger et al. | 376/261 |
| 4,895,695 | 1/1990 | Shallenberger et al. | 376/261 |
| 5,251,243 | 10/1993 | Nylund et al. | 376/261 |

FOREIGN PATENT DOCUMENTS 4235685 4/1993 Fed. Rep. of Germany .

OTHER PUBLICATIONS

Patent Abstracts of Japan, vol. 14, No. 565, (P-1143), Dec. 17, 1990, JP-A-02 242 194, Sep. 26, 1990.

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

There are disclosed an assembling apparatus and an assembling method of a nuclear fuel assembly by which flaws or scratches to be formed on the surfaces of the fuel rods can be reduced. The fuel rods are inserted into the grid cells of the supporting grids under the state where the supporting grids are disposed in proximity to each other. Therefore, it is possible to remarkably reduce the fall-down movement of the tip portion of the fuel rod. Conventionally, the tip portion or lower surface of the fuel rod inevitably comes in contact with the grid cell of the supporting grid, so that the scratches might be formed on the surface of the fuel rod, which deteriorates the quality of the fuel assembly. However, according to the present method and apparatus, it is possible to avoid the interference between them so that the scratches to be formed on the surface of the fuel rods can be reduced remarkably.

4 Claims, 6 Drawing Sheets

METHOD FOR ASSEMBLING NUCLEAR FUEL ASSEMBLY AND APPARATUS THEREFOR

BACKGROUND OF THE INVENTION

1. Field of the Invention

The present invention relates to an assembling method and an assembling apparatus for a nuclear fuel assembly which is used in nuclear reactors such as a pressurized water reactor.

2. Conventional Art

Figure 6:
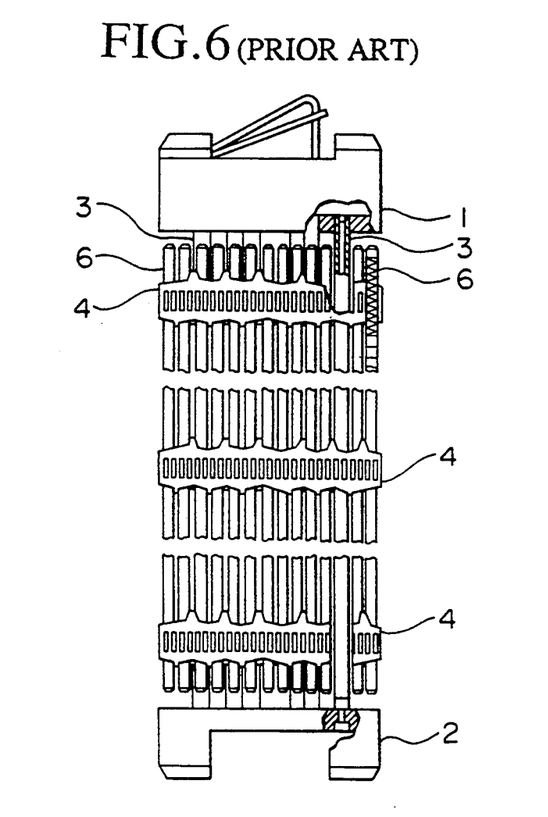
FIG. 6 is a side view of a conventional fuel assembly.

An existing conventional nuclear fuel assembly is illustrated in FIG. 6.

In FIG. 6, numerals 1 and 2 respectively designate a top nozzle and a bottom nozzle which are positioned apart from each other in a vertical direction and disposed so as to face each other. A plurality of control-rod guide pipes 3 are extended between and securely fixed to the top and bottom nozzles 1, 2. A plurality of supporting grids 4 are secured to intermediate portions of the respective control-rod guide pipes 3 such that they are vertically positioned apart from each other.

Figure 7:
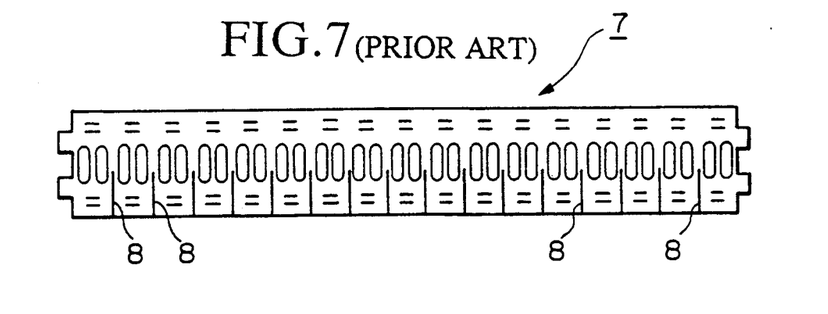
FIG. 7 is a front view of a strap which is used for constructing the supporting grid of the fuel assembly.
Figure 8:
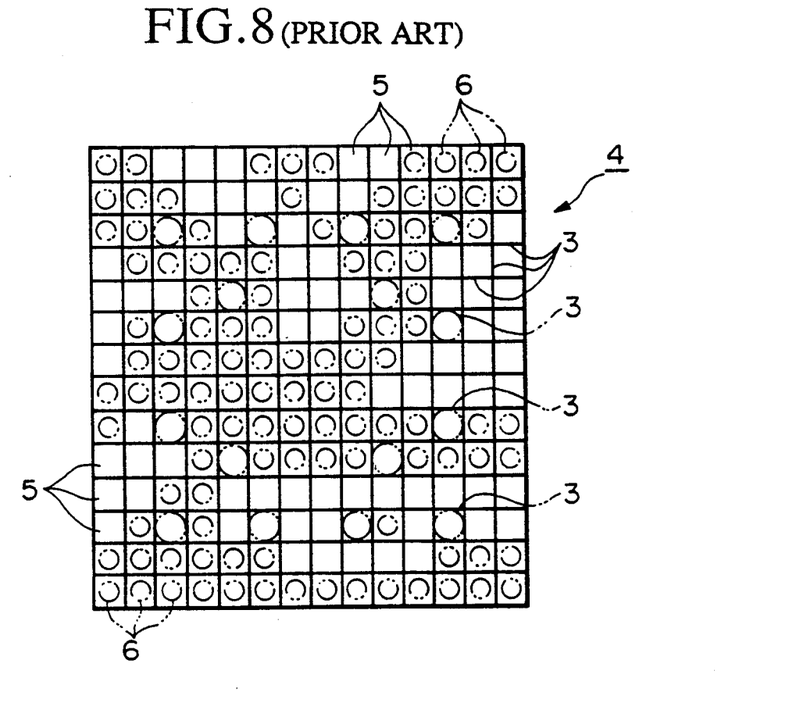
FIG. 8 is an plan view view showing the grid cells of the supporting grid in which the fuel rods are inserted.
Figure 9:
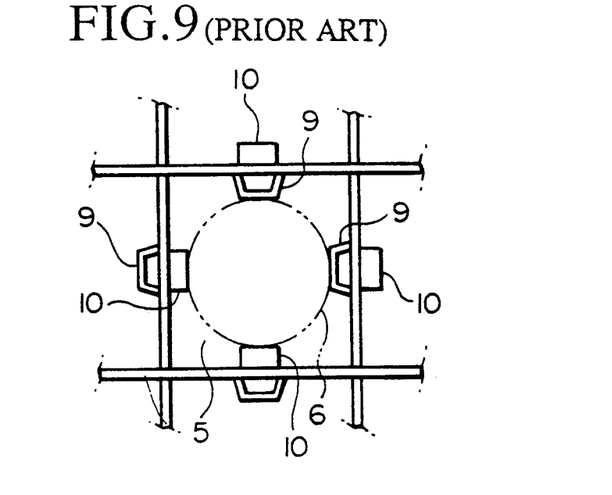
FIG. 9 is an enlarged view of a grid cell of the supporting grid shown in FIG. 8.

As illustrated in FIGS. 7 to 9, the foregoing supporting grid 4 is formed such that a plurality of straps 7 are assembled perpendicularly to each other into a grid form by the mutual fitting of slits 8 which are formed and equally spaced in the longitudinal direction in the strap, and consequently, a plurality of grid cells 5 are formed in each grid. On the walls of the prescribed grid cells 5, there is provided a pair of dimples 9 and springs 10 which are arranged to face each other, for holding a fuel rod 6. The fuel rod 6 inserted in the grid cell 5 is held in the grid 5 by being pressed against the dimples 9 by the springs 10.

According to the conventional method for inserting the fuel rod 6 into the grid cell 5 in the above-mentioned fuel assembly, a plurality of supporting grids 4 (normally, eight supporting grids) of which grid cells 5 are directed in a horizontal direction are disposed into a line in a horizontal direction such that they are disposed apart from each other by the predetermined equal spacing; key members are inserted into the supporting grid 4 so as to deflect the springs 10 away from the dimples 9; and then, a plurality of fuel rods 6 are inserted horizontally into the grid cells 5, thus assembling the fuel assembly.

Meanwhile, the fuel rod generally in use comprises a zircaloy-clad tube having a cylindrical shape of 4 m length or less, and an outer diameter of approximately 10 mm. For this reason, when inserting the fuel rod 6 into the grid cell 5 horizontally in accordance with the foregoing method, the tip of the fuel rod 6 drops down slightly by its own weight such that it may interfere with the supporting grid 4, or that scratches may be formed on the surface of the fuel rod 6 because the lower surface of the fuel rod 6 comes in contact with the supporting grid 4. This is undesirable for producing a fuel assembly of high quality and reliability.

SUMMARY OF THE INVENTION

Accordingly, it is the object of the present invention to provide an assembling method and an assembling apparatus for nuclear fuel assembly in which the fuel rods can be inserted into the grid cells of the supporting grid without forming scratches on the fuel rod.

In one aspect of the present invention, there is provided a method for assembling a nuclear fuel assembly, wherein a plurality of fuel rods are inserted into respective grid cells of each of a plurality of supporting grids which are disposed apart linearly from each other, the method comprising the steps of:

arranging in advance the plurality of supporting grids in proximity to each other;

transferring the fuel rods from a fuel magazine into the plurality of supporting grids by inserting the fuel rods successively from the supporting grid disposed on one side towards the supporting grid disposed on the other side; and pulling the fuel rods out from the fuel magazine while separating and disposing the plurality of supporting grids at predetermined positions.

In another aspect of the present invention, there is provided an assembling apparatus for a nuclear fuel assembly, in which a plurality of supporting grids are linearly disposed and arranged in proximity to each other, and a plurality of fuel rods are successively inserted into respective grid cells of each of the supporting grids in a direction from the supporting grid disposed on one side to the supporting grid disposed on the other side, the apparatus comprising:

a holding mechanism for holding the fuel rods inserted through the grid cells of the plurality of supporting grids immovably relative to the supporting grid disposed on the other side;

a transfer mechanism for moving the plurality of supporting grids and the holding mechanism to increase spacing between adjacent supporting grids; and a positioning mechanism for placing the plurality of supporting grids at predetermined positions.

Further objects and advantages of the present invention will be apparent from the following descriptions of the preferred embodiment of the present invention, with reference to the accompanying drawings.

DESCRIPTION OF THE PREFERRED EMBODIMENT

[A] Construction of the Assembling Apparatus

The construction of the assembling apparatus according to an embodiment of the present invention will be presented with reference to FIGS. 1 to 5. The same parts as in the nuclear fuel assembly described above will be designated by the same reference numerals, and detailed description thereof will be omitted.

Figure 4:
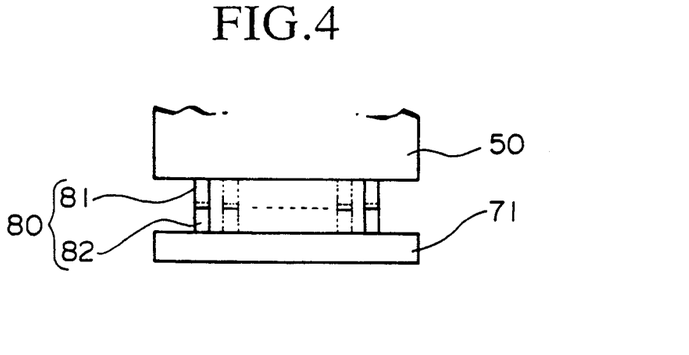
FIG. 4 is a front view illustrating the main parts of the positioning mechanism employed in the embodiment.
Figure 5:
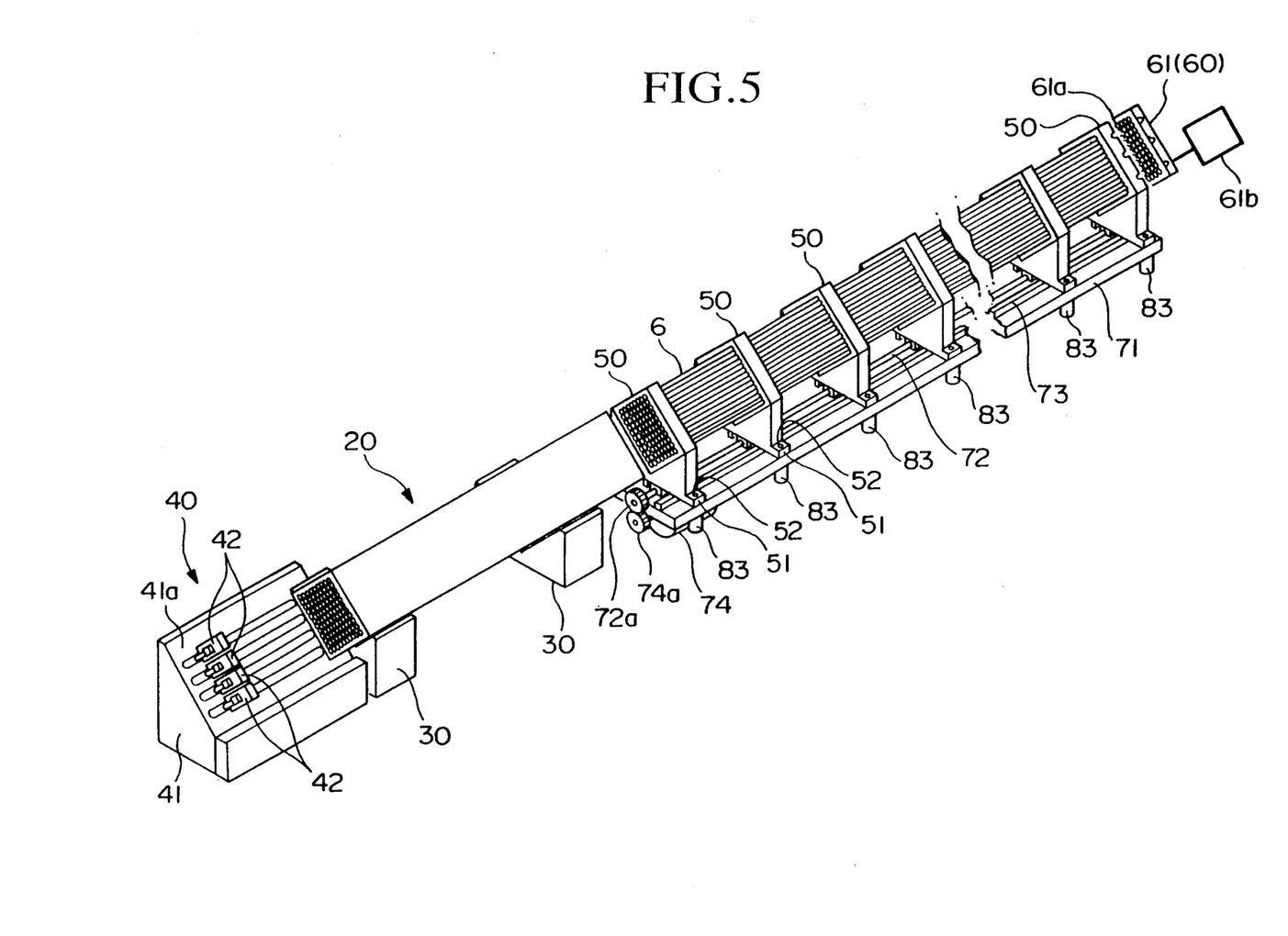
FIG. 5 is a perspective view illustrating the assembling apparatus of the fuel assembly in the operating condition.

The assembling apparatus according to the present embodiment comprises: a rectangular-parallelepiped fuel magazine 20 which stores a plurality of parallel fuel rods 6 therein; two bases 30 which support the fuel magazine 20 from the bottom thereof; a pushing mechanism 40, arranged at one side (left side of FIG. 1) of the fuel rods 6 stored in the fuel magazine 20, which pushes these fuel rods toward the other side (right side of FIG. 1); nine support members 50, linearly disposed at the other side of the fuel magazine 20, which hold the supporting grid 4 therein in a freely detachable manner; a holding mechanism 60, attached to the other surface (the surface on right side in FIG. 1) of the support member 50 disposed at the other end, which fixes the fuel rods 6 to the support member 50, thereby holding the fuel rods 6 immovably relative to the supporting grid 4 disposed on the other side; a transfer mechanism 70, arranged at the lower-surface side of the support members 50, which can move the support member 50 and the holding mechanism 60 forward and backward in the horizontal direction (left-to-right and vice-versa in FIG. 1); and a positioning mechanism 80, for positioning each of the supporting grids 4, having projections formed at the upper surface of the transfer mechanism 70 opposing the lower surface of the support members 50 (see FIG. 4).

Figure 1:
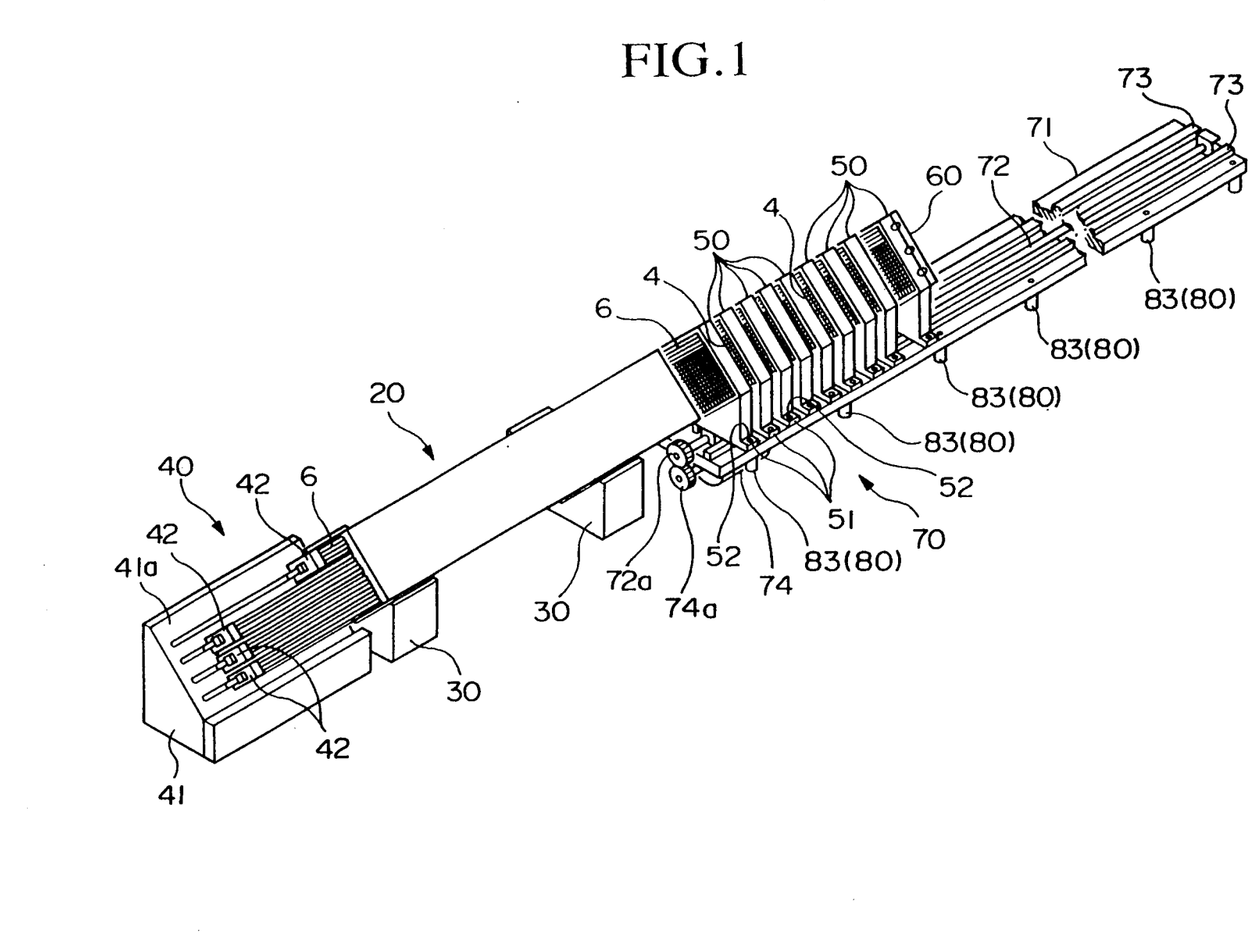
FIG. 1 is a perspective view illustrating the construction of the assembling apparatus for the fuel assembly according to an embodiment of the present invention.

The foregoing fuel magazine 20 has a length which is shorter than the lengths of the fuel rod 6, so that one end of the fuel rods 6 protrudes beyond the fuel magazine 20.

The pushing mechanism 40 comprises a stand 41 which has a top surface 41a defining an inclined surface 41 parallel to the side surface of the fuel magazine 20; four push-in plates 42 of a generally rectangular shape disposed on the inclined surface 41 so as to face one end of the fuel rods 6; and a driving mechanism (not shown) which independently moves the push-in plates 42 forward and backward in the axial direction of the fuel rods 6.

On both sides of the support members 50 are formed flanges 51, each being provided with a through hole with which a cylinder rod of a pneumatic cylinder device 83 (described later in detail) is engaged.

The holding mechanism 60 comprises: a generally square-shaped suction body 61 (FIG. 5) which has a plurality of depressions 61a with suction apertures formed in one surface so that the other ends of the fuel rods 6 are engaged with these depressions 61a, and is attached freely detachably to the surface of the support member 50 at the other side; and a vacuum device 61b such as a vacuum pump which is provided on the suction body 61, for reducing the inside pressure of the suction body 61 to a negative pressure so that the fuel rods 6 engaged with the depressions 61a are secured to the suction body 61.

Figure 2:
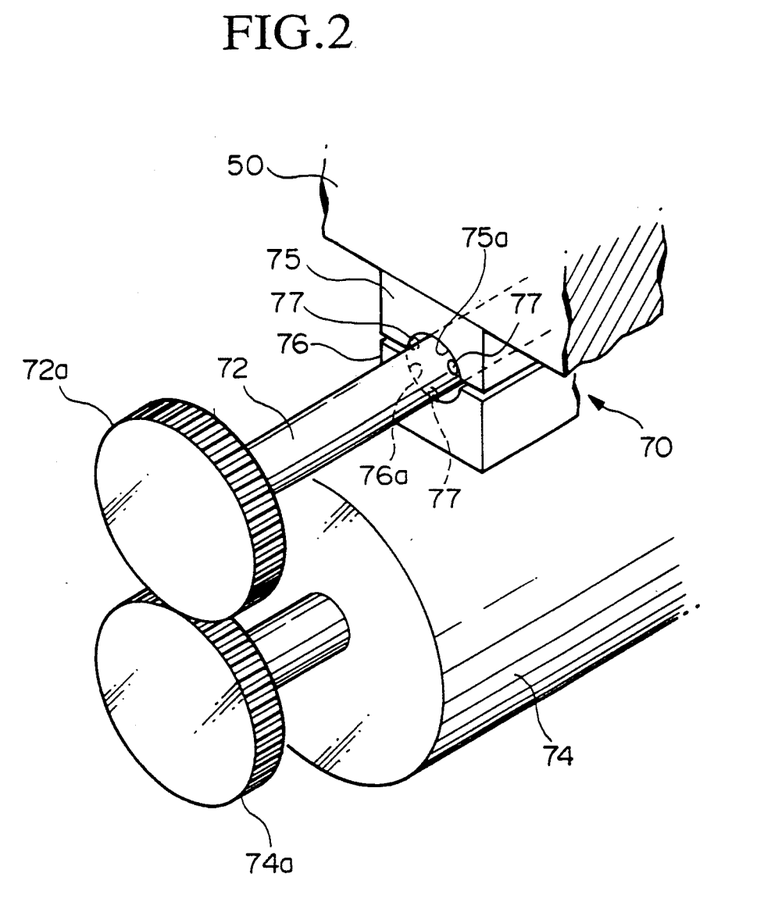
FIG. 2 is a perspective view illustrating essential parts of the transfer mechanism employed in the embodiment.
Figure 3:
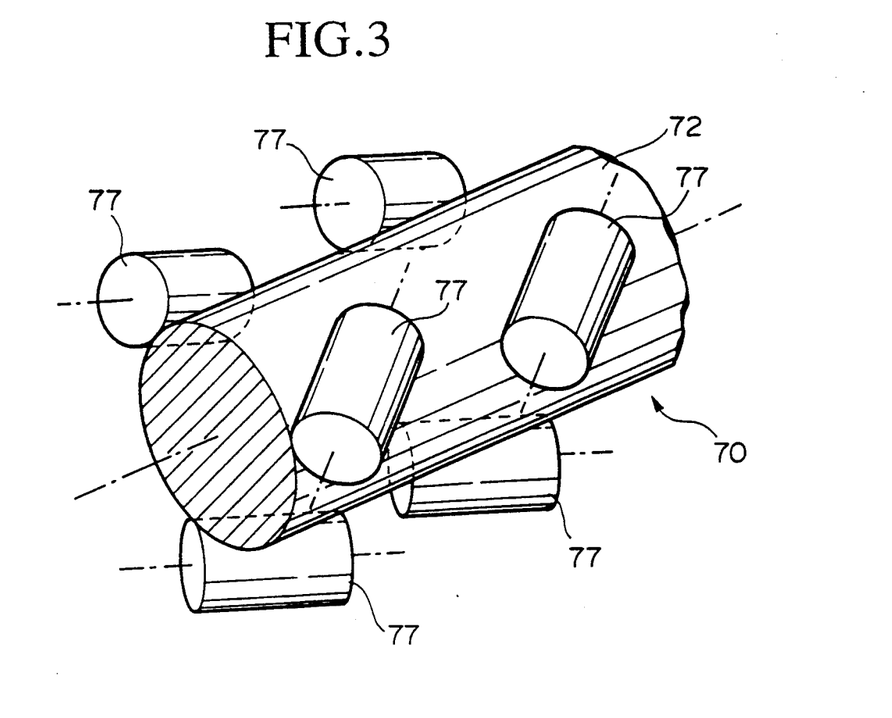
FIG. 3 is a perspective view illustrating another part of the transfer mechanism.

The transfer mechanism 70 comprise a base 71 of an elongated plate-like shape disposed below the support members 50 so as to extend along the fuel rods 6; a shaft 72 which is rotatably mounted at the center portion of the support surface of the base 71 along the longitudinal direction thereof; rails 73, respectively fixed at both sides of this shaft 72, for supporting the support members 50; a motor 74, fixed on the lower surface of the base 71 at one side, for rotating the shaft 72 by means of gears 46a and 72a; upper bearings 75 each of which is fixed at the lower surface of each support member 50 and formed with a semi-circular groove 75a for accommodating the upper portion of the shaft 72 as illustrated in FIG. 2; lower bearings 76 each of which is securely fixed with each upper bearing 75 by a bolt and formed with another semi-circular groove 76a for accommodating the lower portion of the shaft 72; and a total of six cylindrical rollers 77, disposed freely rotatably in the inside space formed by the grooves 75a and 76a. As best shown in FIG. 3, two sets of three rollers 77 are disposed so that each set is spaced axially of the shaft 72 and three rollers in each set are respectively arranged at three circumferentially equally spaced positions on the outer periphery of the shaft 72. In FIG. 2, illustration of the base 71 is omitted for simplicity.

As illustrated in FIG. 3, the above-mentioned rollers 77 are disposed such that an axis of each roller 77 is inclined with respect to the axis of the shaft 72. By rotating the roller 77 by means of the shaft 72, it is possible to produce a component force in the axial direction of the shaft 72, by which the thrust force of the support members 50 can be produced.

As illustrated in FIG. 4, the foregoing positioning mechanism 80 comprises a plate-shaped projection 81 extending from the lower surface of each support member 50; fitting elements 82 disposed on the upper surface of the base 71, in the width direction, at the positions to enable stopping of the support member 50 to correspond with the projections 81; a pneumatic cylinder device 83, fixed on the lower surface of the base 71 at the side region of the fitting elements 82, for engaging a cylinder rod with a through hole 52 disposed on appropriate position on the support member 50 by passing through the through hole 52 of the support member 50. The projections 81 formed on the support members 50 are located at different positions displaced transversely thereof from each other. Therefore, when moving the support member 50 in the axial direction of the shaft 72, each projection 81 is passing through some fitting elements 82 but comes in contact with its corresponding fitting element only so that the movement of the support member 50 is stopped. Thus, it is possible to locate each of the support members 50 at the desirable position, so that the positioning operation can be performed so as to position the support members 50 in appropriate positions.

[B] Assembling Method

Next, a description will be given with respect to the method of assembling the fuel assembly by use of the assembling apparatus of the foregoing configuration.

First, in the initial condition, the support members 50 and the supporting grids 4 are disposed in proximity to each other as shown in FIG. 1.

Next, by sequentially moving the push-in plates 42 provided in the pushing mechanism 40 in the other direction, the fuel rods 6 are sequentially pushed in and inserted into the grid cells 5 of the supporting grid 4. Such inserting operation is terminated when the other ends of the fuel rods 6 are brought into engagement with the depressions 61a of the suction body 61 of the holding mechanism 60 which is mounted on the support member 50 on the other side.

In the conventional assembling method of the fuel assembly, when inserting the fuel rod 6 into the supporting grid 4, the tip portion of the fuel rod 6 sags down by its own weight so that its lower surface comes in contact with the supporting grid 4, raising a drawback that the scratches may be formed on the surface of the fuel rod 6. In contrast, according to the present method, the fuel rod 6 is inserted into the supporting grid 4 under the condition where they are located in proximity to each other, which reduces the sagging distance of the fuel rod 6. Thus, it is possible to reduce the scratches formed on the surface of the fuel rod 6. In other words, the present method is advantageous in that the quality of the fuel assembly is improved.

According to the present assembling apparatus employing the push-in plates 42 by which the fuel rods 6 are inserted into the supporting grid 4, it is possible to simultaneously insert all of the fuel rods 6 into the supporting grids 4 by simultaneously driving all of the push-in plates 42, so that the inserting operation of the fuel rods can be performed efficiently.

Thereafter, by operating the vacuum device provided with the holding mechanism 60, the inside pressure of the suction body 61 is reduced to a negative pressure so as to securely fix the fuel rods 6 to the depressions 61a. Thus, the fuel rods 6 can be held immovably relative to the supporting grid 4 on the other side by means of the suction body 61 fixed with the support member 50.

Next, by driving the motor 74 of the transfer mechanism 70, the shaft 72 is rotated by means of the gears 72a and 74a, and consequently, the rollers 77 are rotated. This rotation of the rollers 77 produces the thrust force which is imparted to the support members 50 by means of the bearings 75 and 76 in the axial direction of the shaft 72, so that each of the support members 50 can be moved in the direction of the other side. By moving the rightmost support member 50, the fuel rods 6 fixed with this support member 50 can be moved in the direction of the other side. Thus, the fuel rods 6 can be pulled out from the fuel magazine 20.

Since the present assembling apparatus provides the positioning mechanism 80 in which the projection 81 is formed below each support member 50 and the fitting element 82 is formed on the upper surface of the base 71, the projection 81 comes in contact with its corresponding fitting element 82 during the movement of the support member 50 so that the support member 50 can be stopped and located at the desired position. Therefore, the support members 50 can be disposed apart from each other, and consequently, the supporting grids 4 can be located at the desired positions respectively while providing the desirable distances among them, thus, it is possible to produce the predetermined fuel assembly (see FIG. 5). Incidentally, under the condition where the projection 81 of the support member 50 fits with the fitting element 82, the rollers 77 slide on the surface of the shaft 72 in the peripheral direction and both of them are moved relatively to each other. Therefore, after stopping the movement of the support member 50, it is possible to continue the rotation of the shaft 72, thus, making it possible to move the other support members 50 and to locate them at their predetermined positions.

As described above, after disposing all of the support members 50 at their predetermined positions, the motor 74 is stopped and then the pneumatic cylinders 83 of the positioning mechanism 80 are driven so that the rods are engaged with the through holes 52 formed at the flanges 51 of the support members 50 so as to securely fix the support members 50 with the base 71.

Next, the operation of the vacuum device provided in the holding mechanism 60 is stopped so as to remove the suction body 61 from the support member 50 disposed at the other side. Then, as in the conventional method, the supporting grids 4 and the fuel rods 6 are removed as a unit from the support members 50 so that they can be transported and processed in the next process.

Thereafter, when assembling another fuel assembly, the supporting grids 4 are mounted on each support member 50, the rods of the pneumatic cylinders 83 are pulled out from the through holes 52 of the support members 50; and then, the motor 74 is rotated in the reverse direction so as to move the support members 50 close to each other again. In addition, the push-in plates 42 of the pushing mechanism 40 are returned to their initial positions. Then, another fuel magazine 20 storing the fuel rods 6 therein is put on the upper portions of the bases 30. Thereafter, the foregoing operations are repeated.

Meanwhile, some conventional assembling apparatus provides a (e.g., pull-in rod) which holds the tip of the fuel rod 6 and pull the fuel rod 6 into the supporting grid 4 so as to insert the fuel rod 6 into the supporting grid 4. In this case, a stepped portion is formed at the edge portion of the fuel rod 6 in order to securely hold the fuel rod 6 by this jig. In contrast, the present assembling apparatus provides a vacuum operated holding mechanism 60 by which the end portion of the fuel rod 6 is securely fixed thereto, enabling the fuel rods 6 to be inserted into the supporting grid 4. Thus, there is no need for providing a special stepped portion at the end portion of the fuel rod 6, thus simplifying the process of making parts for constructing the fuel rod.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A method for assembling a nuclear fuel assembly, wherein a plurality of fuel rods are inserted into respective grid cells of each of a plurality of supporting grids which are disposed apart linearly from each other, said method comprising the steps of:
   arranging in advance said plurality of supporting grids in proximity to each other;
   transferring said fuel rods from a fuel magazine into said plurality of supporting grids by inserting said fuel rods successively from the supporting grid disposed on one side towards the supporting grid dispose don the other side; and
   pulling said fuel rods out from said fuel magazine while moving and separating said plurality of supporting grids so as to dispose said plurality of supporting grids at predetermined positions along a longitudinal direction of said assembly which correspond a regular positions of the grids in an assembled nuclear fuel assembly.

2. An assembling apparatus for a nuclear fuel assembly, in which a plurality of supporting grids are linearly disposed and arranged in proximity to each other, and a plurality of fuel rods are successively inserted into respective grid cells of each of said plurality of supporting grids from the supporting grid disposed on one side towards the supporting grid disposed on the other side, said apparatus comprising:
   a holding mechanisms for holding said fuel rods inserted through the grid cells of said plurality of supporting grids immovably relative to said supporting grid disposed on the other side;

a transfer mechanism for moving said plurality of supporting grids and said holding mechanism to increase a spacing between adjacent supporting grids; and a positioning mechanism for placing said plurality of supporting grids at predetermined positions along a longitudinal direction of said assembly which correspond to regular position of the grids in an assembled nuclear fuel assembly.

3. An assembling apparatus for a nuclear fuel assembly as defined in claim 2, wherein said holding mechanism includes a suction body having a plurality of depressions formed in a surface thereof, and a vacuum device connected to said suction body for reducing inside pressure of said suction body so that a tip portion of each of said fuel rods is fixed in a respective one of said depressions by vacuum suction.

4. An assembling apparatus for a nuclear fuel assembly as defined in claim 2, further comprising a pushing mechanism having a plurality of push-in plates each disposed adjacent to one end of said fuel rod, each of said push-in plates being movable towards said supporting grids so that said fuel rods are pushed from said fuel magazine into said supporting grids.

* * * * *